3,175,106
INSPECTION APPARATUS
Raymond E. Sansom, New Milford, and Frederick Gordon Weighart, Brookfield, Conn., assignors to Automation Industries, Incorporated, El Segundo, Calif., a corporation of California
Filed Feb. 7, 1963, Ser. No. 256,886
6 Claims. (Cl. 310—8.7)

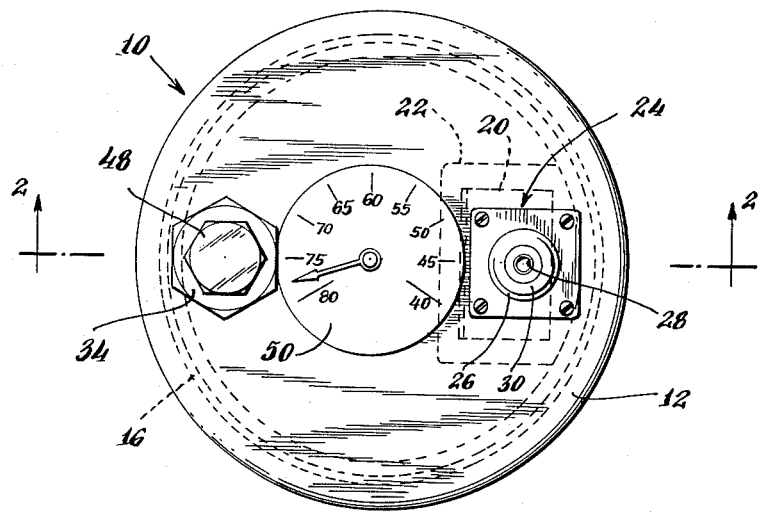
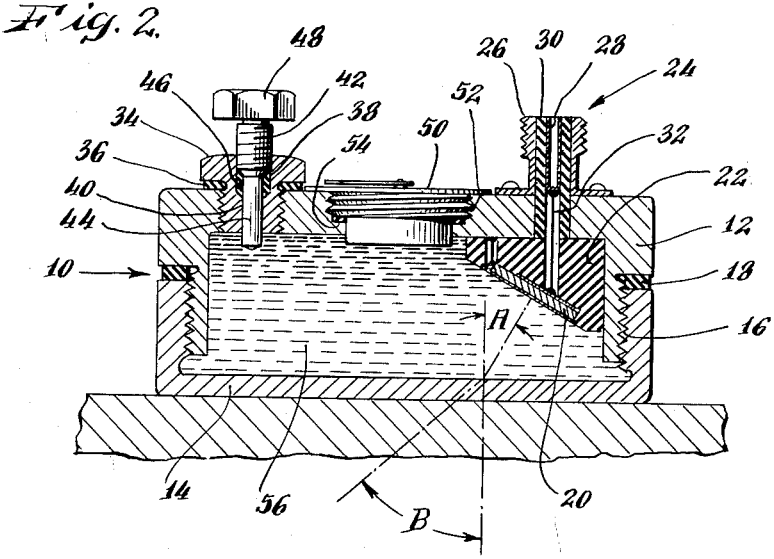

This invention relates to the ultrasonic inspection of solid objects and, more particularly, to a novel search unit for use in such inspection.

Nondestructive testing by use of ultrasonic waves is a widely used method for the inspection of a variety of solid objects. In this technique, a suitable transducer, such as a piezoelectric crystal, is energized by high frequency electrical pulses and the resulting mechanical vibrations of ultrasonic frequency are directed into the object under test. Reflections from discontinuities in the object are then received by either the same or a similar transducer and are reconverted into electrical pulses for visual display or alarm purposes.

In practicing the technique of ultrasonic inspection, it is often desirable to vary the angle at which the ultrasonic beam enters the object under test. However, this is not easily accomplished, especially in non-immersion testing, as the ultrasonic vibrations will not travel satisfactorily through a gaseous medium such as air, but must be coupled to the tested object through a liquid medium. A number of attempts have been made to solve this problem and provide a variable angle transducer. However, in each of these devices a considerable amount of complexity and expense exists. Accordingly, it is the primary object of this invention to provide an improved variable angle search unit. Further objects are to provide such a search unit which is inexpensive, reliable, compact and maintenance-free.

The manner in which these objects are achieved will be more apparent from the following description, the appended claims and the figures of the attached drawing, wherein:

FIG. 1 is a plan view of a search unit constructed in accordance with our invention, and FIG. 2 is a cross section taken along the line 2—2 of FIG. 1.

One of the basic principles of ultrasonics is that the ultrasonic wave follows the principles of Snell's law, which is widely known and widely used in optics. This law defines the relationship of the angles of incidence and refraction of a wave passing between two media having different indices of refraction. In formula form, the law may be written as follows:

$$\frac{\sin A}{\sin B} = \frac{V_1}{V_2}$$

Where A is the angle of incidence between the impinging beam and the normal to the surface, B is the angle between the emerging beam and the normal to the surface, $V_1$ is the velocity of sound in the first medium, and $V_2$ is the velocity of sound in the second medium.

Our invention makes novel use of Snell's Law by providing an ultrasonic transducer mounted at a fixed angle within a search unit comprising a liquid-filled container. We provide means for varying the pressure of the liquid medium, thereby varying the velocity of sound therethrough. When the search unit is placed against the surface of an object to be tested, variation of the pressure on the liquid varies the velocity of sound transmission ($V_1$) and accordingly varies the angle of refraction (B) to maintain the relationship defined by Snell's Law.

By reference to the drawing, the search unit of this invention will be seen to comprise a cylindrical container 10 formed of a top member 12 and a closure cap 14 joined by means of threaded portion 16 and sealed by an annular gasket 18. A piezoelectric crystal transducer 20 is mounted at an angle on a plastic block 22 which is suitably drilled to receive leads making electrical connections in the usual manner between the face and back of the crystal 20 to the case 10 and to a coaxial connector 24. The outer element 26 of the coaxial connector 24 is connected directly to the container 10 to provide a grounding connection and internal conducting cylinder 28 receives the pin from the coaxial cable. A central insulator 30 extends through the case 10, providing insulation for the wire 32. A bushing 34 is threadedly inserted into a tapped hole in the top member 12 and sealing is provided by means of a flexible washer 36. The bushing 34 includes an upper threaded bore 38 and a coaxial smooth bore 40 of smaller diameter which communicates with the interior of the chamber formed by members 12 and 14. Into the threaded bore 38 is inserted the enlarged threaded portion 42 of an elongated pin 44 designed to fit snugly into bore 40. A suitable resilient packing material 46 fills the space between bore 38 and pin 44 to prevent fluid leakage therethrough. The upper end of pin 44 carries a hexagonal head 48. Also included in the top cap 12 is a pressure gauge 50 which may be of any suitable type, such as a Bourdon tube or a diaphragm type. The pressure gauge may be calibrated in terms of angle. The mounting of pressure gauge 50 is not critical and, for purposes of illustration, is shown in FIG. 2 as being effected by screwing into an internally threaded bore 52 in top cap 12. Sealing is provided by means of a gasket 54 between cooperating shoulders of the gauge 50 and the cap 12.

Any type of liquid 55 may be incorporated in the search unit of this invention. However, for best results, the liquid should be as incompressible as possible. This is because the operation of the invention depends for its success upon the variation of pressure within the liquid 54 achieved by the adjustment of pin 44. Unless the liquid is relatively incompressible, too much longitudinal motion of the pin 44 is required, thus presenting a practical limitation. It has been discovered that water is a suitable medium for use in the present search unit. As is illustrated most clearly in FIG. 2, the crystal 20 is positioned at a fixed angle (A) relative to the face of the search unit. In one embodiment, for example, this has been set at 27° to the normal. As expressed in the above equation, the relationship between angles A and B is a function of the velocity of sound in the liquid and the solid medium. Accordingly, advancing or retracting pin 44, thus varying the pressure within the liquid 55, would cause a variation in angle B if angle A is held constant. It is assumed in this example that the material of both the object under test and the search unit container are of the same material (steel). However, this is not an important limitation and it is not necessary to the functioning of the device although some calibration correction of gauge 50 may be required. The following table indicates the manner in which the angle B varies with the change in pressure of the contained liquid 55:

Table

[∠A=27°]

| P.s.i.a. | V(water), cm.×10⁵/sec. | ∠B (Shear waves) |
|---|---|---|
| 14.7 | 1.481 | 90° |
| 500 | 1.488 | 84 |
| 1,000 | 1.493 | 82.5 |
| 1,500 | 1.498 | 81 |
| 2,000 | 1.504 | 80 |
| 2,500 | 1.510 | 79 |
| 3,000 | 1.516 | 77.5 |
| 3,500 | 1.522 | 76.5 |
| 4,000 | 1.527 | 76 |
| 4,500 | 1.533 | 75 |
| 5,000 | 1.539 | 74.2 |

Only shear waves are shown in the above table. Surface waves are useful only at 90°. Also the longitudinal waves are so weak at these angles that they may be ignored.

It will be seen from this disclosure that the search unit of this invention is of a simple and reliable construction which has great utility in the ultrasonic inspection field. It will be apparent that a number of variations and modifications can be made in this invention without departing from the spirit and scope thereof. Accordingly, the foregoing description is intended to be illustrative only rather than limiting. This invention is limited only by the scope of the following claims.

What we clam as new and desire to secure by Letters Patent of the United States is:

1. An ultrasonic search unit which comprises: container means having at least a first surface arranged to be positioned against an object under test; a liquid substantially filling said container; ultrasonic transducer means arranged within said container means to project a beam of ultrasonic energy through said liquid and against said first surface at a preselected angle of incidence; and means for selectively varying the pressure of said liquid to vary the velocity of said ultrasonic energy therethrough.

2. The apparatus of claim 1 wherein said ultrasonic transducer means comprises a piezoelectric crystal.

3. The apparatus of claim 2 wherein said means for varying pressure comprises a threaded member arranged to be advanced into and withdrawn from said container.

4. An ultrasonic search unit which comprises: a first cup-shaped member having a first outer surface adapted to be positioned against an object under test; a second cup-shaped member detachably connected to said first member to define an enclosure therein; a piezoelectric crystal mounted within said enclosure to project ultrasonic energy against said first surface at a preselected angle of incidence; a liquid substantially filling said container; means for selectively varying the pressure of said liquid to vary the velocity of ultrasonic energy therethrough; and means for electrically energizing said piezoelectric crystal to generate said ultrasonic energy.

5. The apparatus of claim 4 wherein said first and second cup-shaped members are cylindrical.

6. The apparatus of claim 5 wherein said second member includes gauge means responsive to the pressure of said liquid.

References Cited in the file of this patent
UNITED STATES PATENTS

| 2,592,134 | Firestone | Apr. 8, 1952 |
| 2,770,741 | Vore et al. | Nov. 13, 1956 |